United States Patent
Furuta

(10) Patent No.: US 9,558,430 B2
(45) Date of Patent: Jan. 31, 2017

(54) IMAGE FORMING APPARATUS USING FILTERS TO CORRECT POTENTIAL DISTRIBUTION ON PHOTORECEPTOR DUE TO SPOT SHAPE OF EMITTED LIGHT

(71) Applicant: CANON KABUSHIKI KAISHA, Tokyo (JP)

(72) Inventor: Yasutomo Furuta, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/680,552

(22) Filed: Apr. 7, 2015

(65) Prior Publication Data
US 2015/0286902 A1 Oct. 8, 2015

(30) Foreign Application Priority Data
Apr. 8, 2014 (JP) .................................. 2014-079155

(51) Int. Cl.
| G06K 15/02 | (2006.01) |
|---|---|
| G06K 15/14 | (2006.01) |
| H04N 1/00 | (2006.01) |
| H04N 1/23 | (2006.01) |
| H04N 1/29 | (2006.01) |
| B41J 2/45 | (2006.01) |
| G03G 15/04 | (2006.01) |
| G03G 15/043 | (2006.01) |

(Continued)

(52) U.S. Cl.
CPC .............. *G06K 15/027* (2013.01); *B41J 2/45* (2013.01); *G03G 15/043* (2013.01); *G03G 15/04063* (2013.01); *G06K 15/1247* (2013.01); *G06K 15/14* (2013.01); *H04N 1/00* (2013.01); *H04N 1/00015* (2013.01); *H04N 1/00082* (2013.01); *H04N 1/036* (2013.01); *H04N 1/2315* (2013.01); *H04N 1/2346* (2013.01); *H04N 1/295* (2013.01); *H04N 1/4015* (2013.01)

(58) Field of Classification Search
None
See application file for complete search history.

(56) References Cited

U.S. PATENT DOCUMENTS

| 5,121,146 A * | 6/1992 | Smith ................ G06K 15/1247 |
|---|---|---|
| | | 257/80 |
| 6,778,204 B2 * | 8/2004 | Morita ....................... B41J 2/47 |
| | | 347/248 |

(Continued)

FOREIGN PATENT DOCUMENTS

JP 2011-046137 A 3/2011

*Primary Examiner* — Scott A Rogers
(74) *Attorney, Agent, or Firm* — Fitzpatrick, Cella, Harper & Scinto

(57) ABSTRACT

The image forming apparatus includes an exposure head. The exposure head includes an organic EL element array and a rod lens array, and forms an image on a photosensitive drum by irradiating light emitted from each organic EL element on the photoreceptor via each rod lens. In the exposure head, light emitting from the organic EL element is controlled by a controller. The controller generates a filter coefficient for correcting a spot shape based on the difference between the spot shape of the light spot on the photosensitive drum and the target spot shape on the photosensitive drum. It is noted that the difference is generated by the deviation between the distance from the organic EL element to the photosensitive drum, and the correct focus position.

33 Claims, 11 Drawing Sheets

(51) Int. Cl.
*H04N 1/036* (2006.01)
*H04N 1/401* (2006.01)
*G06K 15/12* (2006.01)

(56) References Cited

U.S. PATENT DOCUMENTS

| | | | |
|---|---|---|---|
| 7,068,295 B2 * | 6/2006 | Masuda | G06K 15/1247 347/238 |
| 7,701,624 B2 * | 4/2010 | Yamada | G06K 15/027 358/406 |
| 7,916,163 B2 * | 3/2011 | Koizumi | B41J 2/45 347/238 |
| 7,954,917 B2 * | 6/2011 | Inoue | B41J 2/45 347/237 |

* cited by examiner

| k(−7,−7) | k(−6,−7) |     | k(−1,−7) | k(0,−7) | k(1,−7) |     | k(6,−7) | k(7,−7) |
|---|---|---|---|---|---|---|---|---|
| k(−7,−6) | k(−6,−6) | ... | k(−1,−6) | k(0,−6) | k(1,−6) | ... | k(6,−6) | k(7,−6) |

| k(−7,−1) | k(−6,−1) |     | k(−1,−1) | k(0,−1) | k(1,−1) |     | k(6,−1) | k(7,−1) |
|---|---|---|---|---|---|---|---|---|
| k(−7,0) | k(−6,0) | ... | k(−1,0) | k(0,0) | k(1,0) | ... | k(6,0) | k(7,0) |
| k(−7,1) | k(−6,1) |     | k(−1,1) | k(0,1) | k(1,1) |     | k(6,1) | k(7,1) |

| k(−7,6) | k(−6,6) |     | k(−1,6) | k(0,6) | k(1,6) |     | k(6,6) | k(7,6) |
|---|---|---|---|---|---|---|---|---|
| k(−7,7) | k(−6,7) | ... | k(−1,7) | k(0,7) | k(1,7) | ... | k(6,7) | k(7,7) |

FIG. 9

IMAGE FORMING APPARATUS USING FILTERS TO CORRECT POTENTIAL DISTRIBUTION ON PHOTORECEPTOR DUE TO SPOT SHAPE OF EMITTED LIGHT

BACKGROUND OF THE INVENTION

Field of the Invention

The present disclosure relates to an image forming apparatus using an electro photography process, such as a copy machine, a multifunction peripheral, etc.

Description of the Related Art

In some image forming apparatuses of an electro photography type, an electrostatic latent image is formed on a surface of a photosensitive drum by exposing a rotating photosensitive drum with an elongated exposure head (exposure device) having a plurality of light emitting elements. A solid light emitting element, such as an LED (Light Emitting Diode) element or an organic electroluminescence (Electro-Luminescence) element, may be used as a light emitting element. An exposure head includes a plurality of light emitting elements (hereinafter referred to as "light emitting element array") arranged in a direction of an axis of rotation of a photosensitive drum, and a rod lens array for performing image formation of light from each light emitting element on a photosensitive drum. The exposure head irradiates light on the rotating photosensitive drum. Therefore, on the photosensitive drum, a light spot is formed with its scanning direction being identical to a circumferential direction of the photosensitive drum.

The length of the light emitting element array is defined according to a length of an image formation area of the photosensitive drum in a direction of an axis of rotation. An interval between light emitting elements is defined according to a resolution of the image forming apparatus. For example, when the resolution of the image forming apparatus is 1200 [dpi (dot per inch)], since the pixel interval between the image formed is 21.1 [μm] (rounded to 1 decimal place), the interval between the light emitting element is also set to 21.1 [μm]. The length of the light emitting element array should be longer than that of printing width in the direction of the axis of rotation of the photosensitive drum. The number of light emitting elements is defined by printing width and resolution. For example, when the printing width in the direction of the axis of rotation of the photosensitive drum is 297 [mm], and when the resolution of image forming apparatus is 1200 [dpi], about 14,000 light emitting elements, which is identical to the number of pixels, are arranged in a light emitting element array.

In the image forming apparatus using such an exposure head, as compared to an image forming apparatus of a laser scan type in which a deviation scan with a polygon mirror of a laser beam is performed, since the number of parts used is decreased, it is easy to manufacture the image forming apparatus in a smaller size with more reduced cost. Further, by precisely determining a focal length to the surface of the photosensitive drum to be irradiated, it is possible to decrease the diameter of a light spot formed by exposure of the photosensitive drum. By decreasing the diameter of the light spot, a resolution of an image forming apparatus can be increased, and image sharpness can be increased.

In an exposure head using a rod lens array a focus error may occur on the irradiation surface due to an assembly error of an exposure head, etc. If a focus error occurs, light via each rod lens does not form an image at a point on a surface to be irradiated. In this case, the defective image occurs since the light spot is not formed in the correct shape. In the present disclosure, a light spot which is not formed in the correct shape is referred to "failed spot". Since the spatial relationship between an emitting element and the rod lens array differs for each light emitting element, when a focus error occurs, an exposure distribution of a failed spot in a scanning direction and that in a direction perpendicular to the scanning direction differ from each other. In order to prevent the defective image by modification due to deformation of a light spot, Japanese Patent Application Laid-open No. 2011-046137 describes an apparatus in which a shape of a light spot is measured and a peak light volume of a light emitting element is adjusted based on the measured result.

In an image forming apparatus which performs a multiple gradation control, when a light spot is deformed to be a failed spot, a concentration variation amount in a low concentration area of an image and that in a high concentration area of the image may differ from each other. For example, since a light spot is large in a low concentration area, there are many isolated dots in the low concentration area, thus the color of the image becomes pale because of the sparseness of the dots. In the high concentration area, since the image tends to be high-density, white color areas are narrowed, thus the color of the image becomes deep. As described in Japanese Patent Application Laid-open No. 2011-046137, since the method of adjusting the peak light volume of a light emitting element cannot adjust concentration for each gradation level, it is not possible to adjust the concentration for all gradation levels. Therefore, an image forming apparatus which prevents the image deterioration resulting from deformation of a shape of a light spot is desired.

SUMMARY OF THE INVENTION

An image forming apparatus of the present disclosure includes: an exposure unit including a light emitting element array and a rod lens array, and configured to form an image on a photoreceptor by irradiating light emitted from the light emitting element array on the photoreceptor via the rod lens array, wherein the light emitting element array includes a plurality of light emitting elements and the rod lens array includes a plurality of rod lens, a filter coefficient generation unit configured to generate a filter coefficient for correcting the spot shape based on the difference between a spot shape of a light spot on the photoreceptor and a target light spot shape on the photoreceptor. The difference is generated by a deviation between a distance from the light emitting element to the photoreceptor and a focal length of the plurality of rod lens. The apparatus also includes a control unit configured to perform filter processing on image data which represents an image using the filter coefficient, and configured to cause the light emitting elements to emit light based on the image data after the filter processing.

Further features of the present invention will become apparent from the following description of exemplary embodiments (with reference to the attached drawings).

BRIEF DESCRIPTION OF THE DRAWINGS

FIG. 9 is an explanatory diagram of a filter coefficient.

DESCRIPTION OF THE EMBODIMENTS

Hereinafter, an embodiment of the present disclosure is described in detail with reference to the accompanying drawings.

First Embodiment

An image forming apparatus of this embodiment includes an exposure device with a substrate on which a plurality of EL devices are arranged as light emitting elements. This exposure device exposes a surface of a photoreceptor. The image forming apparatus corrects a shape of a light spot on the photoreceptor by performing, based on the deviation amount of a focal length of an exposure device and a spatial relationship of the light emitting elements and a rod lens, a filter process of image data representing an image to be formed. The image data includes information required for forming the image, such as concentration and color for every pixel etc., of the image to be formed. In addition to the organic EL elements, LED elements may be used for light emitting elements of the exposure device.

Configuration of Image Forming Apparatus

Figure 1:
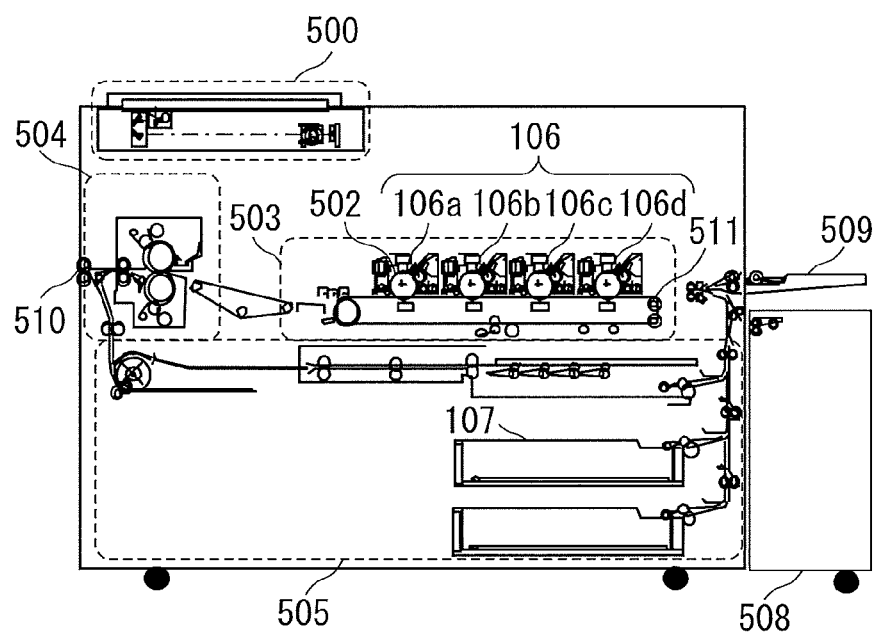
FIG. 1 is an overall configuration diagram of an image forming apparatus.

FIG. 1 is an overall configuration diagram of an image forming apparatus according to this embodiment. An image forming apparatus includes a scanner part 500, an imaging unit 503, a fixing unit 504, and sheet feeding/conveyance unit 505. The operation of these configuration elements of the image forming apparatus is controlled by a printer control unit (not shown). Each process of scanning, imaging, fixing, and feeding/conveyance explained below is smoothly performed under control of the printer control unit.

A scanner unit 500 optically reads an original image by exposing light on an original placed on a platen. The scanner unit 500 converts the read original image into electrical signals to generate image data.

The image forming unit 503 performs image forming processing according to the image data generated in the scanner unit 500. The image forming unit 503 includes an exposure head 106 as an exposure device, photosensitive drum 502 as a drum-shaped photoreceptor, and a transfer belt 511. The exposure head 106 emits light according to the image data and exposes photosensitive drum 502. There are provided four exposure heads 106 (i.e., exposure heads 106a, 106b, 106c, and 106d). Corresponding to the exposure head 106, there are also provided four photosensitive drums 502. The photosensitive drum 502 is driven to rotate, and the surfaces of the photosensitive drum 502 are charged by a charger. An electrostatic latent image according to the image data is formed on the photosensitive drum 502 by exposing its surface, after charging of the same, with the exposure head 106. Since the photosensitive drum 502 is exposed during its rotation, the circumferential direction of the photosensitive drum 502 becomes the scanning direction. The electrostatic latent image is developed by toner. Thereby a toner image is formed on the photosensitive drum 502.

For each of the four photosensitive drums 502, a toner image of a different color is formed. In this embodiment, the toner images of four colors, i.e., cyan (C), magenta (M), yellow (Y), and black (K) are formed. The toner images respectively formed on the photosensitive drums 502 are transferred to the transfer belt 511 so as to sequentially overlap each other. Thereby a full-color toner image is formed on the transfer belt 511 without color shift. After performing the transfer, the toner remaining on each photosensitive drum 502 is collected.

The feeding/conveyance unit 505 includes a sheet feed tray 107 in which a sheet for image printing is set, manual feed tray 509, and an external sheet feeding device 508. The feeding/conveyance unit 505 conveys the sheet to the image forming unit 503 synchronized with the timing of image forming processing by the image forming unit 503. Feeding/conveyance unit 505 conveys a sheet to the image forming unit 503, for example, according to the timing of a transfer completion of the toner image to the transfer belt 511. The toner image formed on the transfer belt 511 is transferred to the sheet conveyed in the image forming unit 503. The sheet having the toner images transferred thereon is conveyed to a fixing unit 504.

The fixing unit 504 is constituted by the combination of rollers and belts, and is provided with a heat source, such as a halogen heater. The fixing unit 504 performs fixing by melting the toner image transferred on the sheet with heat and pressure. The sheet on which the toner image has been fixed by the fixing unit 504 is discharged outside the image forming apparatus through the discharge roller 510.

Configuration of Exposure Head

Figure 2A:
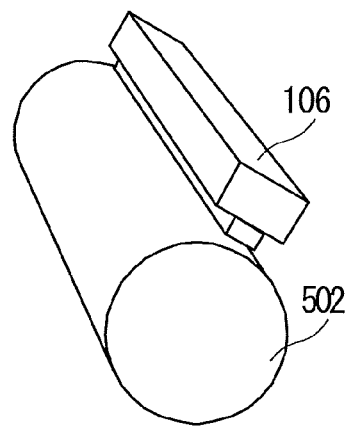
FIGS. 2A and 2B are explanatory configuration diagrams of an exposure head.
Figure 2B:
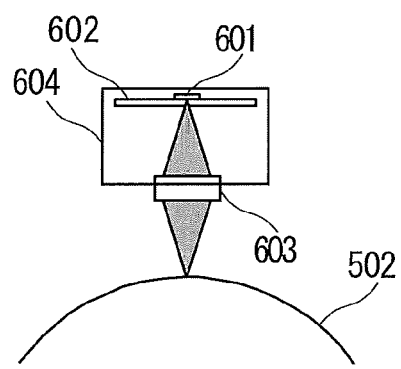

FIGS. 2A and 2B are explanatory structural diagrams of the exposure head 106. FIG. 2A represents the arrangement of the exposure heads 106 with respect to the photosensitive drum 502. FIG. 2B represents the condensing state, in the photosensitive drum 502, of light emitted from the exposure head 106. The exposure head 106 and the photosensitive drum 502 are respectively attached to the image forming apparatus with attaching members (not shown).

The exposure head 106 includes an organic EL element array 601 as a light emitting element array which consists of a plurality of organic EL elements, a substrate 602 in which the organic EL element array 601 is embedded, and a rod lens array 603. The substrate 602 is of an elongated plate like shape. Each organic EL element of organic EL element array 601 is provided in the longitudinal direction of the substrate 602. The organic EL element array 601, the substrate 602, and the rod lens array 603 are attached to and integrated into the housing 604. Exposure head 106 performs solely the focus adjustment of each spot (exposure position) and a light volume adjustment. At the time of exposure, photosensitive drum 502 rotates. Therefore, light emitted from each of the plurality of organic EL elements scans in the circumferential direction of the photosensitive drum 502 which is perpendicular to the direction in which the organic EL elements are positioned.

The rod lens array 603 has an optical characteristic of being equal in magnification such that light from the organic EL element array 601 is irradiated on the surface to be irradiated (i.e., the surface of the photosensitive drum 502) with equal magnification. The exposure head 106 is arranged so that both the distance between the photosensitive drum 502 and the rod lens array 603, and the distance of the rod lens array 603 and the organic EL element array 601 are identical to a predetermined focal length. Thereby, a light spot according to a shape of the light emitting surface and an arrangement position of the organic EL element array 601 is formed on the photosensitive drum 502. As the light emitting surface size of an organic EL element is increased, the size of the light spot on the photosensitive drum 502 will also be increased. Further, the resolution of exposure head is increased by narrowing the interval of the organic EL elements. For example, in case the exposure head 106 has a resolution of 1200 [dpi], the organic EL elements are arranged on the substrate 602 with the interval of 21.16 [μm]. Further, as to an image forming apparatus with a resolution of 1200 [dpi] and for A3 (297 [mm]) sheet size, about 14000 organic EL elements are provided on the exposure head 106.

The exposure head 106 performs, at the time of assembly, a focus adjustment for adjusting a focal length, and a light volume adjustment for adjusting the light volume for each organic EL element. In the focus adjustment, an adjustment of the attachment position of the rod lens array 603 is performed for causing the distance of the rod lens array 603 and the organic EL element array 601 to be a desired value. In light volume adjustment, each of the organic EL elements are sequentially lit for adjusting a driving current of each organic EL element for obtaining a predetermined amount of light condensed by the rod lens array 603.

Figure 3:
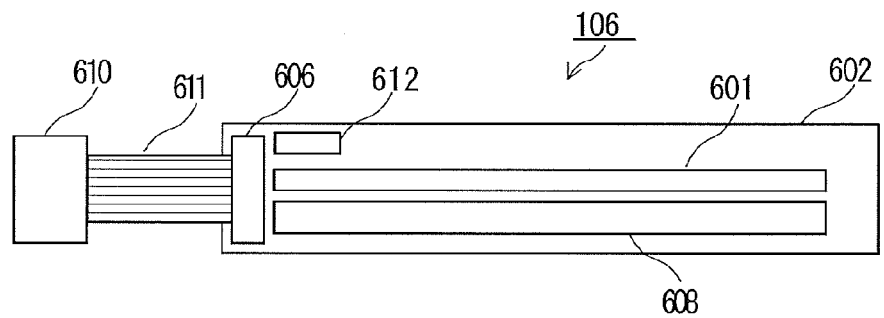
FIG. 3 is a diagram illustrating a connection relation of an exposure head and a controller.

FIG. 3 is a diagram illustrating a connection relation of an exposure head 106 and a controller 610 for inputting a control signal in the exposure head 106. The organic EL element array 601 arranged on the substrate 602 is connected to the controller 610 via a wiring pattern 608 and a connector 606. On the substrate 602, a memory 612 which stores focal length information of the exposure head 106 is provided. The controller 610 is a kind of computer provided with a CPU (Central Processing Unit), a RAM (Random Access Memory), and a ROM (Read Only Memory). The controller 610 reads focal length information from the memory 612 on the substrate 602, and performs a filter process on the image data based on the information. The focal length information represents a deviation amount of a focal length from the right focus position for every organic EL element, which arises from an error at the time of assembly of the rod lens array 603, the substrate 602 and the housing 604. The focal length information is measured after the assembly and written in the memory 612.

Figure 4:
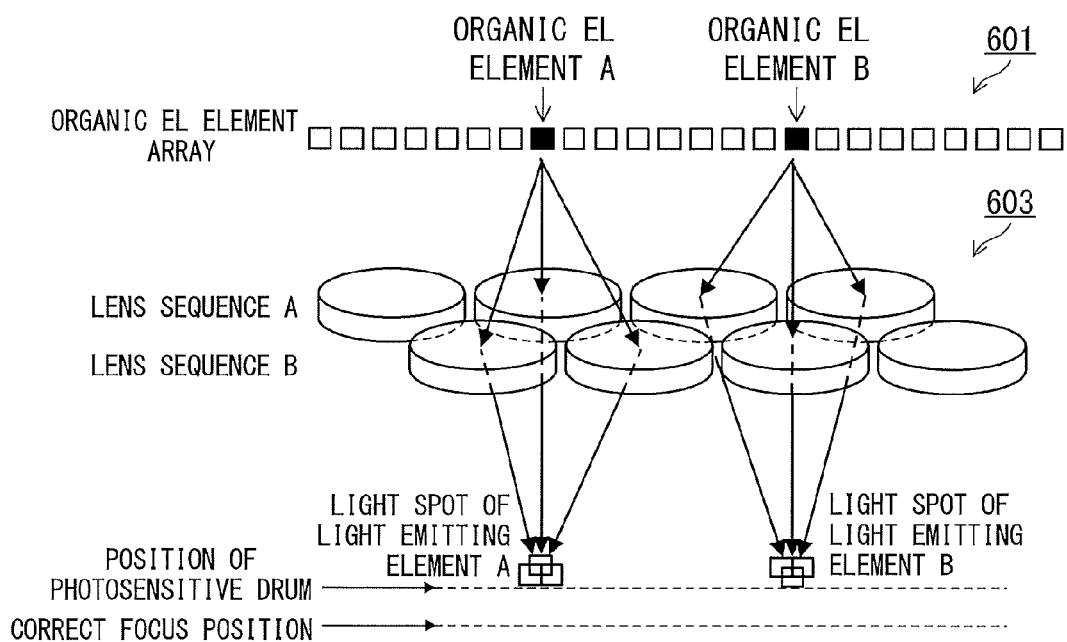
FIG. 4 is a diagram illustrating a focus error of a light spot.

FIG. 4 is an explanatory diagram for illustrating a focus error of the light spot. The rod lens array 603 includes two sequences, i.e. a lens sequence A and a lens sequence B. The organic EL elements A of the organic EL element array 601 are arranged in the lens sequence A, and the organic EL elements B are arranged in the lens sequence B. Each of the light emitted from the organic EL element A and B penetrates the lens sequence A and lens B, respectively, and is exposed on the photosensitive drum 502.

When the focus position is on the photosensitive drum 502, the light via the lens sequence A and the lens sequence B is condensed at a point, thereby preventing a failed spot and generating a light spot. However, when the focus position is out of the surface of the photosensitive drum 502, the light spot is deformed and a failed spot occurs, as illustrated in FIG. 4. Further, since the distance between the organic EL element A and rod lens array 603 differs from that between the organic EL element B and rod lens array 603, each of the shapes of light spot differs from each other. Therefore, even if an identical correction is performed for the organic EL element A and the organic EL element B, each shape of the light spots cannot match each other.

The focal length information stored in the memory 612 represents the distance of the correct focus position illustrated in FIG. 4 and the position of the photosensitive drum 502, for example.

Processing by the Controller

Figure 5:
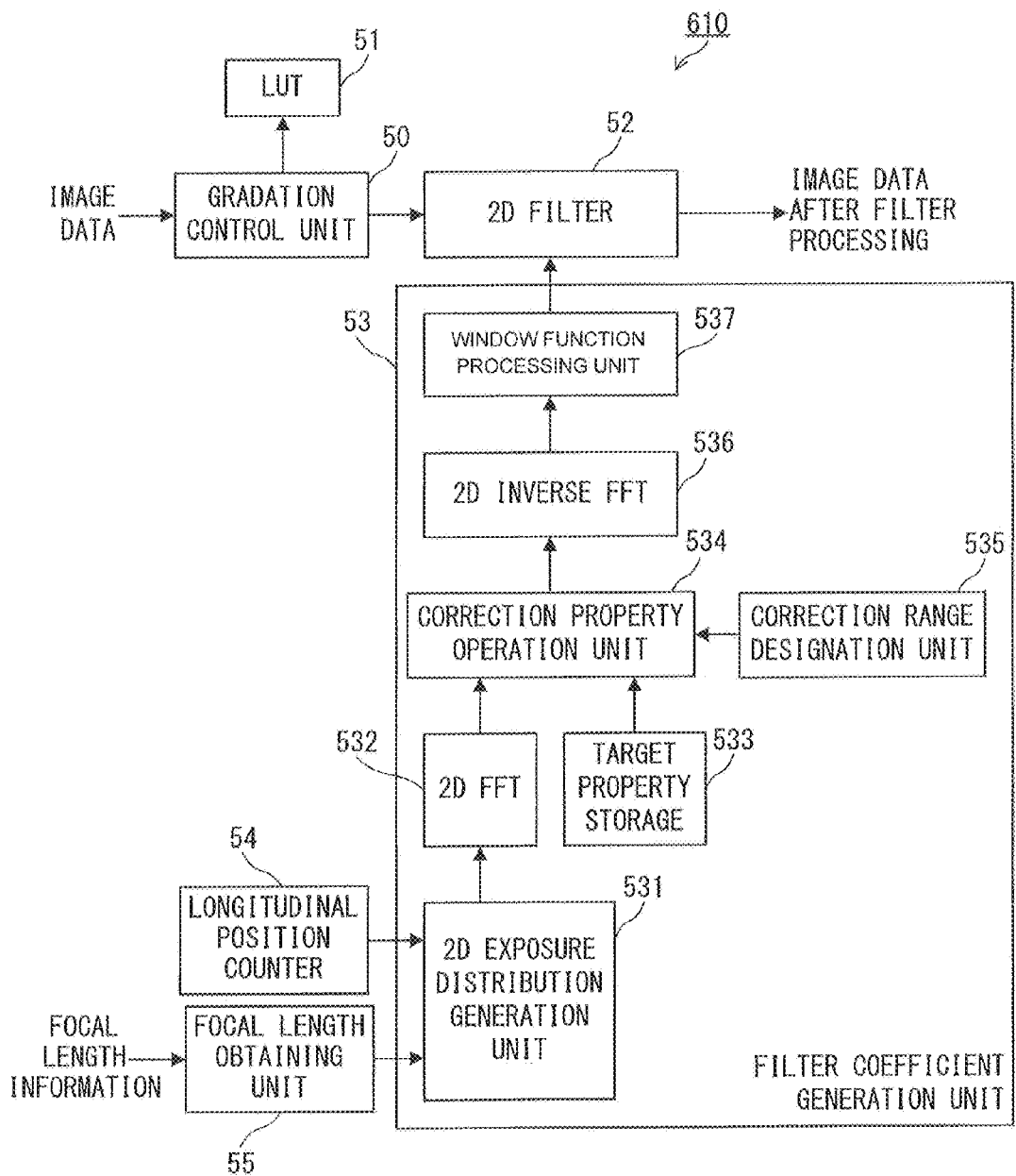
FIG. 5 is a diagram illustrating a functional block of a controller.

FIG. 5 is a diagram illustrating a functional block of the controller 610. Each function block is realized by, for example, causing a CPU to read a computer program in a ROM, to extend it on a RAM as a work area, and to execute it. In the controller 610, a gradation control unit 50, a LUT (Look Up Table) 51, a 2D filter 52, a filter coefficient generation unit 53, a longitudinal position counter 54, and a focal length obtaining unit 55 are formed. By forming these function blocks, the controller 610 performs filter processing to the image data, the luminescence of each organic EL element is controlled based on the image data after the filter processing.

The gradation control unit 50 performs gradation sequence control of the image data according to LUT 51. The LUT 51 is a gradation sequence table for performing a gradation sequence control of the image forming apparatus. The LUT 51 stores information for correcting a concentration gap resulting from the characteristic of the photosensitive drum 502, the development characteristic, etc. 2D filter 52 performs a filter processing to the image data to which the gradation sequence control has been performed, and corrects the light spot shape for every organic EL element. The 2D filter 52 performs the filter processing using a filter coefficient described later.

The filter coefficient generation unit 53 generates the filter coefficient used for the filter processing by the 2D filter 52. In the filter processing, for a pixel on which exposure from each organic EL element of the exposure head 106 is performed, a pixel and a light exposure amount of a light spot are related. The organic EL element located in a line in the longitudinal direction of the substrate 602 is caused to emit light sequentially from one end in this embodiment. Therefore, the filter processing is performed one pixel by one pixel from the pixel corresponding to the organic EL element at one end of the organic EL elements provided in the longitudinal direction of the substrate 602. Here, the filter processing is performed one by one from the pixel corresponding to the organic EL element at the left end in FIG. 4. In this embodiment, "1" is assigned to the organic EL element at left end, and the number is assigned in order from it.

The longitudinal position counter 54 increments the count value by "1" for every filter processing. The count value of the longitudinal position counter 54 corresponds to the number of the organic EL element, thereby it is possible to specify the organic EL element corresponding to the pixel which is the target of the filter processing. If the count value reaches the count value which specifies the organic EL element at the right end, the count value is cleared. The longitudinal position counter 54, the 2D filter 52, and the filter coefficient generation unit 53 operate in synchronization with a common clock of operation, and perform the filter processing on one pixel for every one clock.

The focal length obtaining unit 55 obtains focal length information from a memory 612 provided on the substrate 602, and sends it to the filter coefficient generation unit 53. Since the focal length information is inherent to the exposure head 106, it is stored in the memory 612 on the exposure head 106.

The filter coefficient generation unit 53 includes a 2D exposure distribution generation unit 531, a 2D FFT (Fast Fourier Transfer) 532, a target property storage 533, a correction property operation unit 534, a correction range designation unit 535, a 2D inverse FFT 536 and a window function processing unit 537.

The 2D exposure distribution generation unit 531 derives the exposure distribution, which is two-dimensional data. This is performed based on 1) the position of the organic EL element corresponding to the pixel to be the target of the filter processing obtained by the count value of the longitudinal position counter 54 and 2) the focal length information. This exposure distribution represents the shape of a deformed spot of the light spot which is generated by a focus error. The spot shape is uniquely determined based on the position of the organic EL element with respect to the rod lens array 603. The 2D exposure distribution generation unit 531 stores 1) the position with respect to the rod lens array 603 of each organic EL element in relation with 2) the exposure distribution (shape of the spot) corresponding to the deviation amount of the position in the direction of a focus. The 2D exposure distribution generation unit 531 derives the exposure distribution from the stored contents at the time of image formation.

The 2D FFT 532 performs a frequency conversion of the exposure distribution derived by the 2D exposure distribution generation unit 531. The target property storage 533 stores the reference characteristic of the exposure distribution (light spot shape) to be the target of correction. The target property storage 533 stores the design center value of the light spot shape for each rod lens, for example. The correction property operation unit 534 derives the correction data for correcting the difference between the exposure distribution (spot shape) derived by the 2D exposure distribution generation unit 531 and the reference characteristic (light spot shape) stored in the target property storage 533 to be reduced. The correction data K ($\omega x$, $\omega y$) is calculated by the following formulas, wherein the spatial frequency characteristic of the exposure distribution of the object to be corrected is Ft ($\omega x$, $\omega y$), and the spatial frequency characteristic of the reference characteristic is Fr ($\omega x$, $\omega y$); K ($\omega x$, $\omega y$)=Fr ($\omega x$, $\omega y$)/Ft ($\omega x$, $\omega y$).

The correction range designation unit 535 previously designates the spatial frequency to which small correction effect is obtained, and clips off the correction data K within the specified predetermined range into a range of a predetermined value. In this embodiment, correction data K is clipped into "0". By clipping the correction data K into a range of a predetermined value, the filter coefficient is clipped into the range of a predetermined value (for example, "0").

The 2D inverse FFT 536 performs the reverse frequency conversion of the correction data K calculated by the correction property operation unit 534, and generates a filter coefficient k (x, y) of a size of (15×15) pixels, for example. The window function processing unit 537 calculates a filter coefficient kw (x, y) which is windowed by a previously set window function w (x, y), by the filter coefficient k (x, y) generated by the 2D inverse FFT 536. The filter coefficient kw is calculated by the following formulas, and is used in the filter processing in the 2D filter 52. It is noted that, in this embodiment, the humming window is set for the window function w (x, y):kw(x, y)=w(x, y)*k (x, y).

Figure 6:
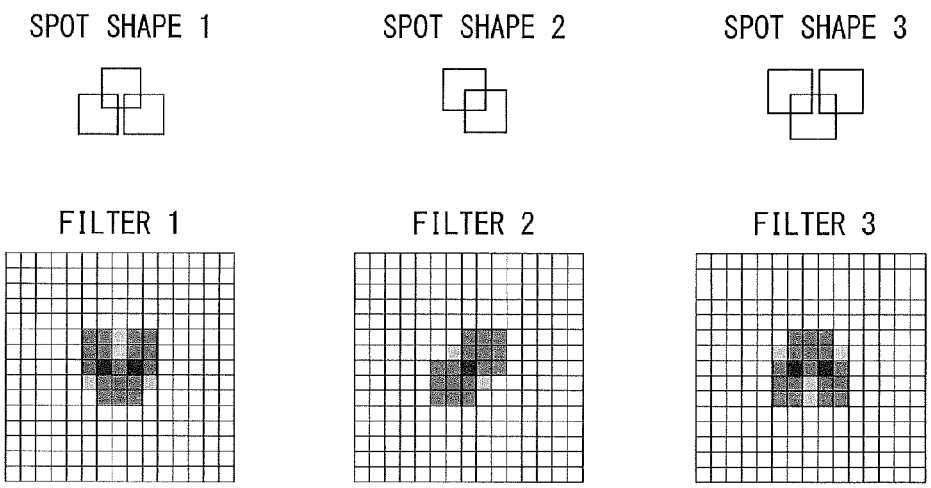
FIG. 6 is an explanatory diagram of a filter coefficient.

FIG. 6 is a diagram of such a filter coefficient kw. In FIG. 6, examples of filters which serve as a reverse character to the three kinds of failed spots are illustrated. The spot shapes 1-3 represent the shape of the light spot before correction. Filters 1-3 represent the shapes of the filters to be overlapped on the shapes of the spots 1-3 by the filter processing. The filter coefficient kw represents the shape of such a filter.

The spot shape 1 is, for example, the failed spot generated by light emitted from the organic EL element A in FIG. 4, in which two light spots are formed with the rod lenses in the lens sequence B, one light spot is formed with the rod lenses in the lens sequence B. The filter 1 is of a shape which forms a light spot of (5*5) pixels by overlapping it on the spot shape 1. Similarly, by overlapping the filter 2 on the spot shape 2, a light spot of (5*5) pixels is obtained and by overlapping the filter 3 on the spot shape 3, a light spot of (5*5) pixels is obtained. The light spot of (5*5) pixels serves as an exposure distribution of the correction target stored in the target property storage 533.

Thus, by overlapping the filter to the failed spot, a substantially same-shaped light spot is obtained, thus it is possible to prevent image deterioration resulting from a deformation of a light spot shape due to a focus error. By performing the above filter processing for every pixel, and by performing a suitable correction process for every pixel by the 2D filter 52, it is possible to prevent the failed spot generated based on the spatial relationship of the rod lens array 603 and each of the organic EL elements. Thereby, uniform exposure distribution is obtained for the sequence of the organic EL element array 601.

It is noted that the focal length information may be previously stored in memory 612, or may be measured in real time to use the same. For example, in an image forming apparatus, a ranging sensor, which measures focal length, may be formed inside thereof, and a filter processing is performed based on the focal length measured by the ranging sensor. The filter coefficient generation unit 53 generates a filter coefficient with focal length information being the difference between the focal length measured by the ranging sensor and the focal length at a correct focus position. Further, when the shape of the light spot at the end of the rod lens greatly differs from that at the center, information about the shape of the light spot at the position of the rod lens may be stored in the memory 612. In this case, the filter coefficient generation unit 53 obtains the information about the shape of the light spot from the memory 612 directly by the 2D exposure distribution generation unit 531, and generates the filter coefficient.

Other Examples of the Process by a Controller

Figure 7:
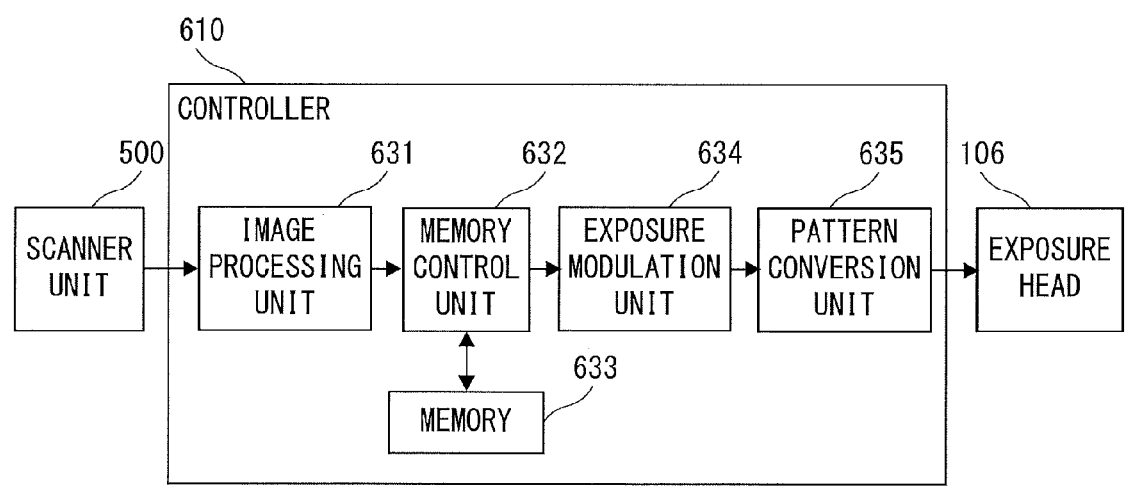
FIG. 7 is a functional block diagram illustrating an example of a controller in an alternative embodiment.

FIG. 7 is a functional block diagram representing the function realized in controller 610, in order to perform the filter processing of other embodiments. Each function provided in the controller 610 is realized by executing a predetermined computer program or by using hardware. Controller 610 obtains image data from a scanner unit 500, and according to the obtained image data, a light emitting control of each organic EL element of the exposure head 106 is performed. The controller 610 includes an image processing unit 631, a memory control unit 632, a memory 633, an exposure modulation unit 634, and pattern conversion unit 635.

The image processing unit 631 divides the image data obtained from the scanner unit 500 for every color. The image processing unit 631 performs a conversion process to a pixel data corresponding to the image by image data, and a screen processing according to each color. The memory control unit 632 writes the image data processed by the image processing unit 631 into the memory 633, and the reads the image data, which is written according to the execution timing of an image forming process, from the memory 633. The memory control unit 632 sends the read image data to the exposure modulation unit 634.

The exposure modulation unit 634 performs the filter processing of the image data input from the memory control unit 632, and sends it to the pattern conversion unit 635. The pattern conversion unit 635 converts the image data processed by the exposure modulation unit 634 into binary data. The pattern conversion unit 635 rearranges a transmission order of the image data according to a lighting order of each organic EL element of the exposure head 106, and inputs a control signal according to the image data into the exposure head 106 in the order of the rearranged transmission.

Figure 8:
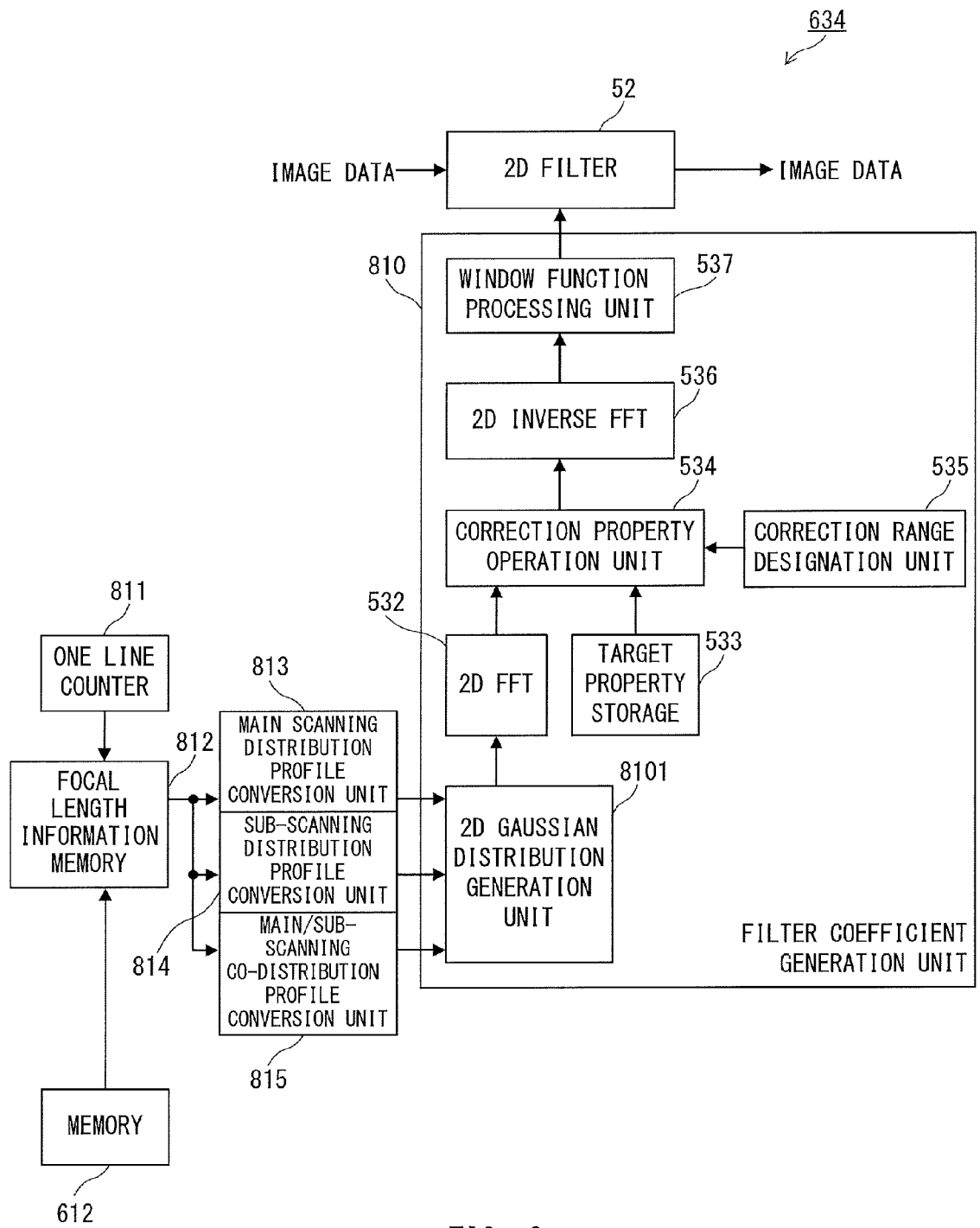
FIG. 8 is a diagram illustrating a detailed configuration of an exposure modulation unit.

FIG. 8 is a specific configuration diagram illustrating a detail of the exposure modulation unit 634. The exposure modulation unit 634 is provided with the 2D filter 52 which includes the same function as FIG. 5. In addition to this, the exposure modulation unit 634 includes a filter coefficient generation unit 810, a one line counter 811, a focal length information memory 812, a main scanning distribution profile conversion unit 813, a sub-scanning distribution profile conversion unit 814, and a main/sub-scanning co-distribution profile conversion unit 815. The image data is input into the 2D filter 52 from the memory control unit 632. Using a filter coefficient k (0, 0) for a pixel which forms an image (target pixel) and a filter coefficient k (m, n) for a circumferential pixel located in a circumference with its center being the target pixel, the 2D filter 52 corrects image data of the target pixel.

FIG. 9 is a diagram of a filter coefficient. FIG. 9 illustrates a filter coefficient matrix (15×15) representing filter coefficients of the target pixel k (0, 0) and the circumferential pixels k (m, n). The filter coefficient used in the filter processing is generated by a filter coefficient generation unit 810 using the filter coefficient matrix. The filter coefficient generation unit 810 generates the filter coefficient using the one line counter 811, the focal length information memory 812, the main scanning distribution profile conversion unit 813, the sub-scanning distribution profile conversion unit 814, and the main/sub-scanning co-distribution profile conversion unit 815.

The exposure distribution of light emitted from the exposure head 106 on the photosensitive drum 502 is determined by the focal length of the exposure head 106 and the photosensitive drum 502. The focal length information for each organic EL element stored in the memory 612 (refer to FIG. 3) of the exposure head 106 is copied in the focal length information memory 812 in the exposure modulation unit 634. A main scanning distribution profile conversion unit 813 determines distribution value σx (first distribution value) in a main scanning direction (hereinafter "x direction") according to the focal length information for each organic EL element. The sub-scanning distribution profile conversion unit 814 determines the distribution value σy (second distribution value) of a sub-scanning direction (hereinafter "y direction") according to the focal length information on each organic EL element. The main/sub-scanning co-distribution profile conversion unit 815 determines co-distribution value ρxy (the third distribution value) of the x direction and the y direction according to the focal length information on each organic EL element. The exposure distribution on the photosensitive drum 502 can be approximated by the following formulas with the distribution value σx, σy, and co-distribution value ρxy.

$$f(x,y)=(1/2\pi\sigma x\sigma y(1-(\rho xy)2)^{1/2})\exp(y/\sigma y)(-\frac{1}{2}(1-(\rho xy)2))(-(x/\sigma x)2+(y/\sigma y)2-2\rho xy-(x/\sigma x))$$

The main scanning distribution profile conversion unit 813 includes a conversion table of the distribution value σx to which the coincidence rate becomes the nearest. The above coincidence rate is a rate at the time of approximating by the above mentioned formula to the shape of exposure distribution. Similarly, the sub-scanning distribution profile conversion unit 814 has a conversion table of the distribution value σy, and the main/sub-scanning co-distribution profile conversion unit 815 has a conversion table of co-distribution value ρxy.

The one line counter 811 starts counting of the number of the organic EL elements for one line, at the timing of starting processing. The count value of the one line counter 811 is a value representing the position x in the main scanning direction. The focal length information memory 812 outputs the focal length information of the organic EL element at the position according to the count value of the one line counter 811 to the main scanning distribution profile conversion unit 813, the sub-scanning distribution profile conversion unit 814, and the main/sub-scanning co-distribution profile conversion unit 815.

The filter coefficient generation unit 810 includes a 2D Gaussian distribution generation unit 8101, the 2D FFT 532, the target property storage 533, the correction property operation unit 534, the correction range designation unit 535, the 2D inverse FFT 536 and the window function processing unit 537. It is noted that the 2D FFT 532, the target property storage 533, the correction property operation unit 534, the correction range designation unit 535, the 2D inverse FFT 536 and the window function processing unit 537 have similar functions illustrated in FIG. 6.

Based on the distribution values σx, σy, and co-distribution ρxy from the focal length information on each organic EL element, the 2D Gaussian distribution generation unit 8101 generates 2D Gaussian distribution data when the target pixel is exposed, which represents the exposure distribution on the photosensitive drum 502 with its center being the target pixel. That is, the 2D Gaussian distribution generation unit 8101 generates, for each position of the main scanning direction or for each of a plurality of blocks (area), the 2D Gaussian distribution data based on the input distribution value. The 2D Gaussian distribution generation unit 8101 inputs the generated 2D Gaussian distribution data into the 2D FFT 532. The 2D FFT 532 generates the characteristic data of spatial frequency by performing Fast Fourier Transform of the 2D Gaussian distribution data which is input from the 2D Gaussian distribution generation unit 8101. The 2D FFT 532 inputs the characteristic data (profile) obtained by the conversion into the correction property operation unit 534.

Figure 10A:
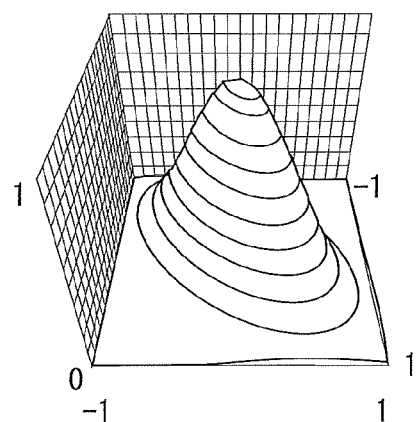
FIGS. 10A to 10C are exemplary diagrams illustrating property data.
Figure 10B:
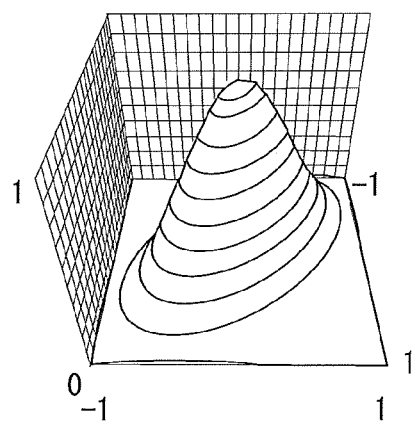
Figure 10C:
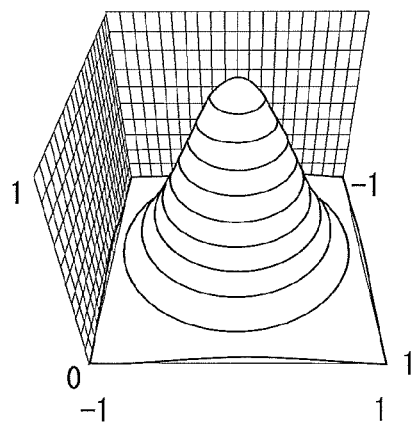

FIGS. 10A-10C are explanatory figures of the characteristic data which is input into the correction property operation unit 534 by the 2D FFT 532. Each axis represents angle frequency, and the distance between pixels corresponds to "0.1". FIGS. 10A and 10B illustrate characteristic data representing the state where the exposure distribution is deformed in a diagonal direction due to the change in the focal length. FIG. 10C illustrates the characteristic data representing the exposure distribution by a suitable focal length. The target property storage 533 stores characteristic data representing the exposure distribution illustrated in FIG. 10C as a reference characteristic (reference data DATA_Ref). The target property storage 533 outputs the reference data DATA_Ref to the correction property operation unit 534 irrespective of the count value of the one line counter 811 during an image formation process.

Figure 11A:
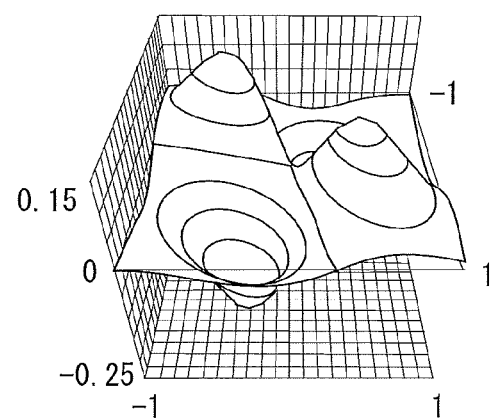
FIGS. 11A and 11B are diagrams illustrating differential data.
Figure 11B:
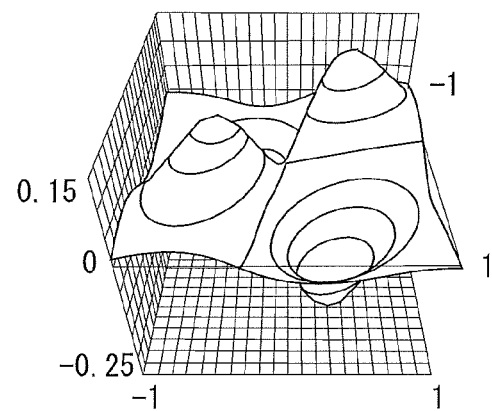

The correction property operation unit 534 generates the difference data based on the characteristic data input from 2D FFT 532 and the reference data DATA_Ref input from the target property storage 533. FIGS. 11A and 11B are explanatory diagrams illustrating such differential data. FIG. 11A illustrates the difference data based on the characteristic data illustrated in FIG. 10A and the reference data DATA_Ref (FIG. 10C). FIG. 11B illustrates the difference data based on the characteristic data illustrated in FIG. 10B and the reference data DATA_Ref. Thus, the difference data represents the difference, as compared with a suitable exposure distribution, for the exposure distribution corresponding to each organic EL element.

Figure 12:
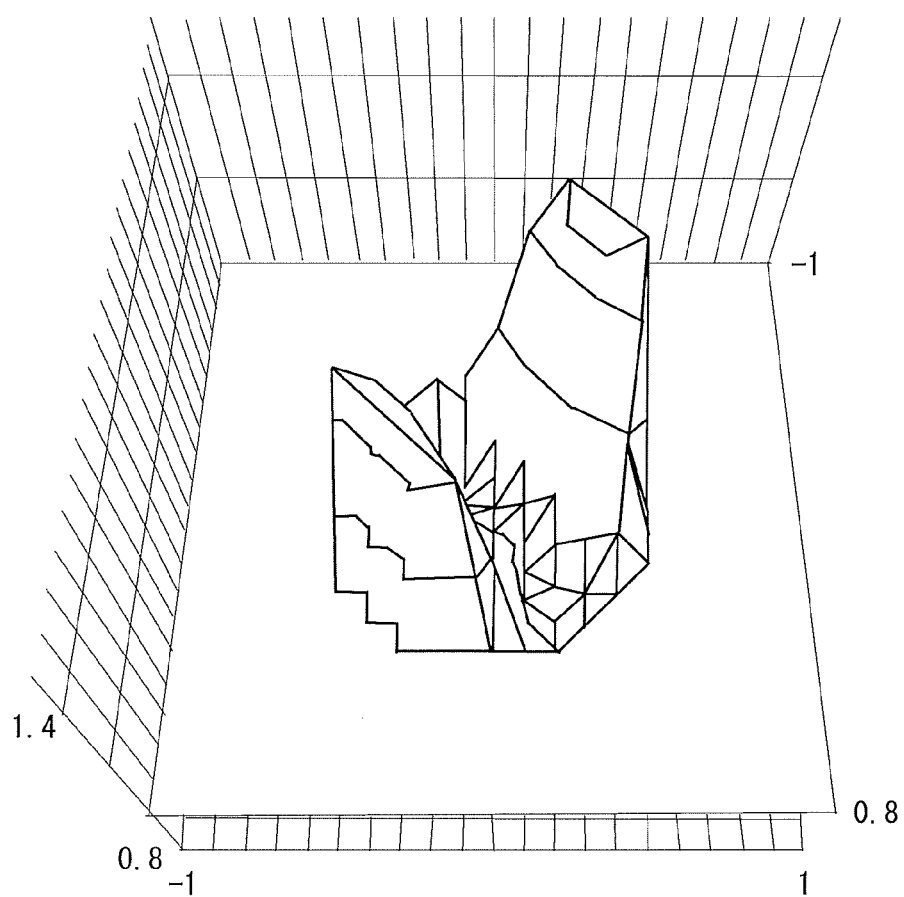
FIG. 12 is an exemplary diagram illustrating correction data.

The correction property operation unit 534 generates correction data based on this difference data. The correction property operation unit 534 generates the correction data so that the difference between the characteristic data and the reference data DATA_Ref is minimized to the extent possible. The correction data K ($\omega$x, $\omega$y) is calculated by the formula which is similar to the operation formula by the correction property operation unit 534 illustrated in FIG. 5. The correction range designation unit 535 designates the spatial frequency to which small correction effect is obtained, and clips off the specified range into a range of a predetermined value. In this embodiment, it is clipped into "0". FIG. 12 is an explanatory diagram of the correction data which is clipped by the correction range designation unit 535 generated based on the difference data of FIG. 11 which is output from the correction property operation unit 534. The correction property operation unit 534 inputs such correction data (FIG. 12) into the 2D inverse FFT 536.

The 2D inverse FFT 536 performs a reverse frequency conversion of the correction data input from the correction property operation unit 534, and generates the filter coefficients of the target pixel and pixels surrounding the target pixel. By generating the filter coefficients, the filter coefficient matrix illustrated in FIG. 9 is generated. In the filter coefficient matrix, the circumferential pixels located in a circumference of the target pixel represent the amount of the electrical potential change in the target pixel due to exposure. In this embodiment, a point symmetry exposure distribution correction for the target pixel is performed. Therefore, the distribution of the filter coefficient k (x, y) becomes point symmetry for the target pixel. The 2D inverse FFT 536 inputs the filter coefficient k (x, y) into the window function processing unit 537.

The window function processing unit 537 outputs a filter coefficient kw (x, y) by correcting the filter coefficient k (x, y) input from the 2D inverse FFT 536 by a previously set window function w (x, y) based on the following formula. In the present embodiment, the humming window is set for the window function w (x, y):kw(x, y)=w(x, y)*k (x, y).

The filter coefficient generation unit 810 performs the above processing for every pixel. The 2D filter 52 corrects the image data based on the filter coefficient kw which is the correction data output from the window function processing unit 537 for every pixel. Thereby, even if it is a case where the exposure distribution differs for every organic EL element of exposure head 106, the non-uniformity of the exposure distribution (the potential distribution of an electrostatic latent image) formed on photosensitive drum 502 can be controlled.

Figure 13:
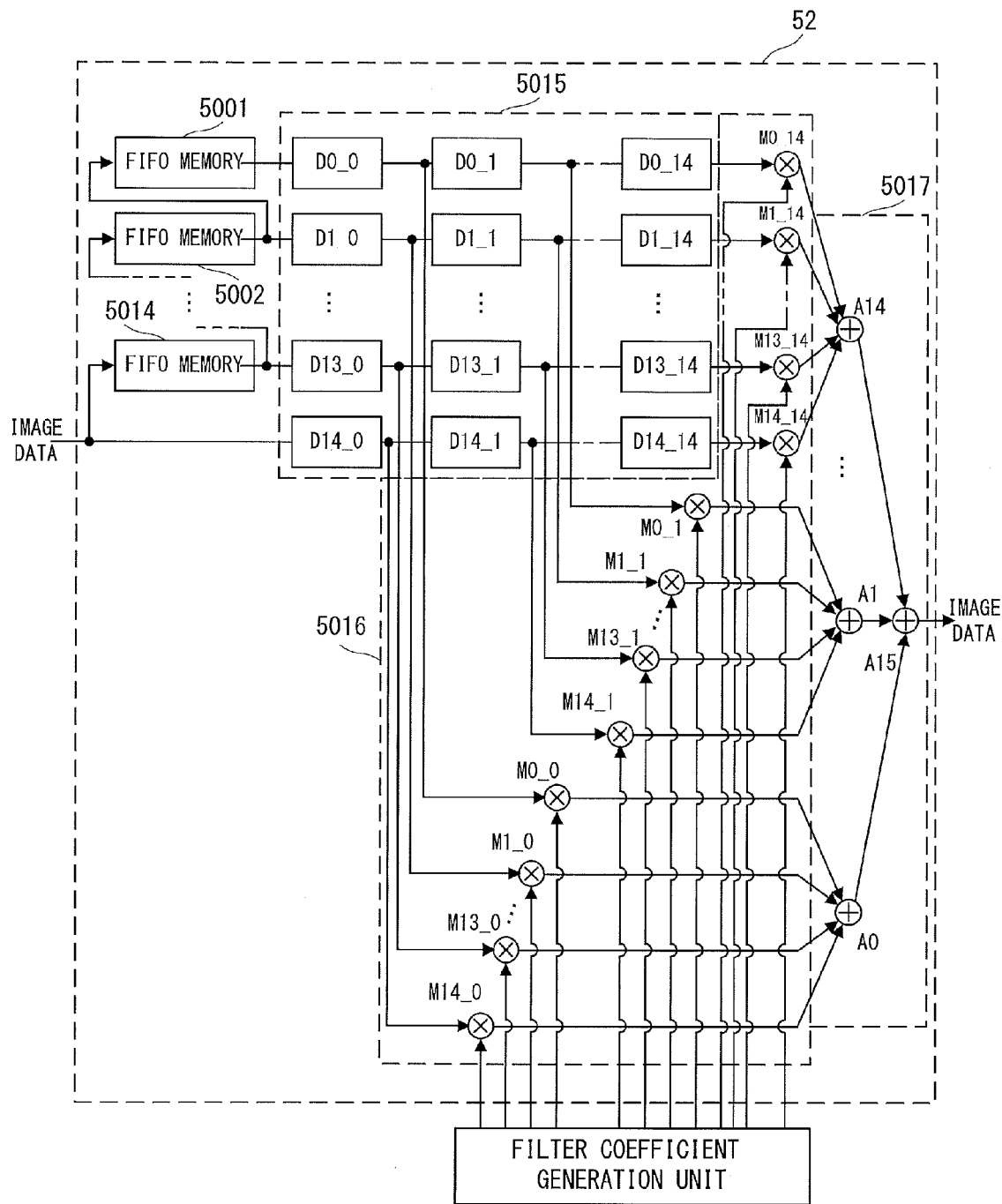
FIG. 13 is a hardware configuration diagram of a 2D filter.

FIG. 13 is a hardware configuration diagram of the 2D filter 52. The 2D filter 52 includes 14 FIFO (First In First Out) memories 5001-5014, a shift register unit 5015, a multiplier unit 5016, and an adding machine unit 5017. Synchronous control of the 2D filter 52 is performed with the clock which performs synchronous control of the controller 610.

The 14 FIFO memories 5001-5014 are the line memory buffers which are connected in series. Further, the 14 FIFO memories 5001-5014 can store the image data of the number of pixels corresponding to the cycle of one line. FIFO memories 5001-5014 output, in synchronization with a clock, the image data input from the scanner unit 500 serially to the shift register unit 5015 in the order.

The shift register unit 5015 includes the registers arranged in (15*15). As the first stage of the shift register group, the 15 registers D0_0-D14_0 are assigned. Each of the second stage to the 15th stage of the shift register groups is configured similarly. The register D0_0 of the 1st stage of the shift register group is connected to the FIFO memory 5001, and serially receives the image data (pixel data) which corresponds to one pixel from FIFO memory 5001. Similarly, registers D1_0-D13_0 in the 1st stage of the shift register group serially receive pixel data from FIFO memories 5002-5013 connected respectively. The register D14_0 of the 1st stage of the shift register group receives pixel data directly from the memory control unit 632. The image data is input into the resister D14_0 and FIFO memory 5014 from the memory control unit 632.

For each resistor in the shift register unit 5015, pixel data for one pixel will be input. The pixel data of the target pixel is input into the register D7_7. The pixel data of the circumferential pixels is input into the other registers.

The multiplier unit 5016 includes (15×15) multipliers M0_0-M14_14. As for each multiplier M0_0-M14_14, one register of the shift register unit 5015 corresponds one by one, and the pixel data for one pixel is input from the corresponding register. For each multiplier M0_0-M14_14, a corresponding filter constant is input from the filter coefficient generation unit 2004. Each multiplier M0_0-M14_14 multiplies pixel data by the filter constant. Each multiplier M0_0-M14_M14 sends the multiplication result to adding machine unit 5017.

The adding machine unit 5017 includes adding machines A0-A15. The adding machines A0-A14 add the multiplication results output from the multipliers M0_x-M14_x. The adding machine A15 adds the addition result of the adding machines A0-A14. The addition result of the adding machine A15 is output from the 2D filter 52 as the image data after the filter processing of the target pixel.

By performing the above process for every pixel, the 2D filter 52 performs suitable correction processing for every pixel corresponding to each organic EL element, and gives a uniform exposure distribution to the longitudinal direction of the exposure head 106. It is noted that, also in this embodiment, the focal length information corresponding to each organic EL element may be, other than storing in the memory 612, measured in real time by the ranging sensor formed in the image forming apparatus and used.

As described above, by performing the filter processing according to the difference between the spot shape of the light spot on the photosensitive drum 502 and a target spot shape, it is possible to prevent the image deterioration resulting from deformation of a shape of the light spot for correcting the deformation of the shape of the light spot.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-079155, filed Apr. 8, 2014, which is hereby incorporated by reference herein in its entirety.

What is claimed is:

1. An image forming apparatus comprising:
a photoreceptor to be rotated;
an exposure unit including a light emitting array including a plurality of light emitting elements configured to emit light and a lens array including a plurality of lenses configured to focus the light emitted from the plurality of light emitting elements on the photoreceptor, wherein the plurality of light emitting elements is arranged in a direction transverse to a rotation direction of the photoreceptor, and the exposure unit forms an electrostatic latent image on the photoreceptor by irradiating light emitted from each of the light emitting elements via the lens array;
a developing unit configured to develop the electrostatic latent image with a toner;
a driving unit configured to drive the plurality of light emitting elements based on driving data corresponding to each of the plurality of light emitting elements;
a data generation unit configured to generate the driving data corresponding to each of the plurality of light emitting elements by using filters, each of which corresponds to one of the plurality of light emitting elements,
wherein each of the filters is set for correcting a potential distribution on the photoreceptor due to a spot shape of light emitted from each of the plurality of light emitting elements on the photoreceptor, and
wherein the data generation unit is configured to generate the driving data for a target pixel with respect to each of the plurality of light emitting elements based on data generated by applying the filter, which corresponds to one of the plurality of light emitting elements, to pixel data for the target pixel and pixel data for adjacent pixels adjacent to the target pixel.

2. The image forming apparatus according to claim 1, further comprising:
a filter generation unit configured to generate each of the filters based on a comparison result between a target spot shape of light on the photoreceptor and each of spot shapes of light emitted from the plurality of light emitting elements on the photoreceptor.

3. The image forming apparatus according to claim 2, further comprising:
a memory configured to store information representing the target spot shape and information representing each of spot shapes of light emitted from the plurality of light emitting elements on the photoreceptor,
wherein the filter generation unit is configured to obtain the information from the memory and generate the filters based on the information.

4. The image forming apparatus according to claim 1, further comprising:
a ranging sensor configured to measure distances from each of the plurality of the light emitting elements to the photoreceptor,
wherein the filter generation unit is further configured to generate each of the filters based on the distance measured by the ranging sensor.

5. The image forming apparatus according to claim 1,
wherein each of the filters includes a plurality of filter coefficients, and each of the plurality of filter coefficients corresponds to one of the adjacent pixels, and
wherein the data generation unit applies each of the plurality of filter coefficients to the pixel data for the adjacent pixels.

6. The image forming apparatus according to claim 1,
wherein each of the filters is a two-dimensional filter, and the two-dimensional filter includes a filter coefficient corresponding to the target pixel and a plurality of filter coefficients of which each corresponds to one of the adjacent pixels.

7. The image forming apparatus according to claim 1,
wherein the plural light emitting elements expose positions on the photoreceptor different from each other, and
wherein the adjacent pixels include pixels adjacent to the target pixels in a rotation direction of the photoreceptor and pixels adjacent to the target pixels in a direction transverse to the rotation direction.

8. The image forming apparatus according to claim 1,
wherein the plural light emitting elements are light emitting diodes.

9. The image forming apparatus according to claim 1,
wherein the plural light emitting elements are organic light emitting elements.

10. The image forming apparatus according to claim 1,
wherein the exposure unit is disposed in the image forming apparatus such that the plural light emitting elements face a surface of the photoreceptor via the plurality of lenses.

11. An image forming apparatus comprising:
a photoreceptor to be rotated;
an exposure unit including a first light emitting element configured to emit first light, a second light emitting element configured to emit second light, a first lens configured to focus the first light on the photoreceptor, and a second lens configured to focus the second light on the photoreceptor, wherein the first light emitting element and the second light emitting element are arranged so that a position exposed by the first light on the photoreceptor in a direction transverse to a rotation direction of the photoreceptor is different from a position exposed by the second light on the photoreceptor in the direction transverse to the rotation direction;
a driving unit configured to drive the first light emitting element based on first driving data corresponding to the first light emitting element and configured to drive the second light emitting element based on second driving data corresponding to the second light emitting element;
a data generation unit configured to generate the first driving data by using a first filter and configured to generate the second driving data by using a second filter, wherein the first filter is set for correcting a potential distribution on the photoreceptor due to a spot shape of the first light on the photoreceptor, and the second filter is set for correcting a potential distribution on the photoreceptor due to a spot shape of the second light on the photoreceptor,
wherein the data generation unit is configured to generate the first driving data for a target pixel for the first light emitting element based on data generated by applying the first filter to pixel data for the target pixel and pixel data for adjacent pixels adjacent to the target pixel, and wherein the data generation unit is configured to generate the second driving data for a target pixel for the second light emitting element based on data generated by applying the second filter to pixel data for the target pixel and pixel data for adjacent pixels adjacent to the target pixel.

12. The image forming apparatus according to claim 11, further comprising:

a filter generation unit configured to generate the first filter based on a comparison result between a target spot shape of light on the photoreceptor and a spot shape of the first light on the photoreceptor and configured to generate the second filter based on a comparison result between a target spot shape of light on the photoreceptor and a spot shape of the second light on the photoreceptor.

13. The image forming apparatus according to claim 12, further comprising:

a memory configured to store information representing the target spot shape, information representing the spot shape of the first light, and information representing the spot shape of the second light, wherein the filter generation unit is configured to obtain the information from the memory and generate the first filter and the second filter based on the information.

14. The image forming apparatus according to claim 13, wherein the first filter and the second filter are two-dimensional filters, and each of the two-dimensional filters includes a filter coefficient corresponding to the target pixel and a plurality of filter coefficients of which each corresponds to one of the adjacent pixels.

15. The image forming apparatus according to claim 12, further comprising:

a ranging sensor configured to measure distances from the exposure unit to the photoreceptor, wherein the filter generation unit is further configured to generate the first filter and the second filter based on the distance measured by the ranging sensor.

16. The image forming apparatus according to claim 12, wherein each of the first filter and the second filter includes a plurality of filter coefficients, each of the plurality of filter coefficients corresponding to one of the adjacent pixels, and wherein the data generation unit applies each of the plurality of filter coefficients to the plurality of pixel data for the adjacent pixels.

17. The image forming apparatus according to claim 12, wherein the first light emitting element and the second light emitting element are light emitting diodes.

18. The image forming apparatus according to claim 12, wherein the first light emitting element and the second light emitting element are organic light emitting elements.

19. An image forming apparatus configured to form an image by developing an electrostatic latent image using a toner, the image forming apparatus comprising:

a photoreceptor to be rotated;

an exposure head including a light emitting array which has a plurality of light emitting elements configured to emit light, and a lens array which has a plurality of lenses configured to focus the light emitted from the plurality of light emitting elements on the photoreceptor, wherein the plurality of light emitting elements is configured to be driven based on driving data and the exposure head is configured to form the electrostatic latent image on the photoreceptor by irradiating the light; and a controller configured to generate the driving data corresponding to each of the plurality of light emitting elements by using filters each of which corresponds to one of the plurality of light emitting elements and is set for correcting a potential distribution on the photoreceptor due to a spot shape of light emitted from each of the plurality of light emitting elements on the photoreceptor, and configured to generate the driving data for a target pixel with respect to each of the plurality of light emitting elements based on data generated by applying the filter, which corresponds to one of the plurality of light emitting elements, to pixel data for the target pixel and pixel data for adjacent pixels adjacent to the target pixel.

20. The image forming apparatus according to claim 19, wherein the controller is configured to generate each of the filters based on a comparison result between a target spot shape of light on the photoreceptor and each of spot shapes of light emitted from the plurality of light emitting elements on the photoreceptor.

21. The image forming apparatus according to claim 20, further comprising:

a memory configured to store information representing the target spot shape and information representing each of spot shapes of light emitted from the plurality of light emitting elements on the photoreceptor, wherein the controller is configured to obtain the information from the memory and generate the filters based on the information.

22. The image forming apparatus according to claim 19, wherein each of the filters includes a plurality of filter coefficients, and each of the plurality of filter coefficients corresponds to one of the adjacent pixels, and wherein the controller applies each of the plurality of filter coefficients to the pixel data for the adjacent pixels.

23. The image forming apparatus according to claim 19, wherein each of the filters is a two-dimensional filter, and each of the two-dimensional filters includes a filter coefficient corresponding to the target pixel and a plurality of filter coefficients of which each corresponds to one of the adjacent pixels.

24. The image forming apparatus according to claim 19, wherein the plural light emitting elements are light emitting diodes.

25. The image forming apparatus according to claim 19, wherein the exposure head is disposed in the image forming apparatus such that the plural light emitting elements face a surface of the photoreceptor via the plurality of lenses.

26. The image forming apparatus according to claim 19, wherein the exposure head includes a substrate on which the light emitting array is arranged and configured to receive the driving data, and wherein the controller is configured to output the driving data to the substrate.

27. An image forming apparatus configured to form an image by developing an electrostatic latent image using a toner, the image forming apparatus comprising:

a photoreceptor to be rotated;

an exposure head including a light emitting array which has a first light emitting element configured to emit first light and a second light emitting element configured to emit second light, and a lens array which has a first lens configured to focus the first light on the photoreceptor and a second lens configured to focus the second light on the photoreceptor, wherein the first light emitting element and the second light emitting element are arranged so that a position exposed by the first light on the photoreceptor in a direction transverse to a rotation direction of the photoreceptor is different from a position exposed by the second light on the photoreceptor in the direction transverse to the rotation direction; and a controller configured to generate first driving data by using a first filter and configured to generate second driving data by using a second filter, wherein the first filter is set for correcting a potential distribution on the photoreceptor due to a spot shape of the first light on the photoreceptor, and the second filter is set for correcting a potential distribution on the photoreceptor due to a spot shape of the second light on the photoreceptor, wherein the controller is configured to generate the first driving data for a target pixel for the first light emitting element based on data generated by applying the first filter to pixel data for the target pixel and pixel data for adjacent pixels adjacent to the target pixel, and wherein the controller is configured to generate the second driving data for a target pixel for the second light emitting element based on data generated by applying the second filter to pixel data for the target pixel and pixel data for adjacent pixels adjacent to the target pixel.

28. The image forming apparatus according to claim 27, wherein the controller is configured to generate the first filter based on a comparison result between a target spot shape of light on the photoreceptor and a spot shape of the first light on the photoreceptor and configured to generate the second filter based on a comparison result between a target spot shape of light on the photoreceptor and a spot shape of the second light on the photoreceptor.

29. The image forming apparatus according to claim 28, further comprising:

a memory configured to store information representing the target spot shape, information representing the spot shape of the first light, and information representing the spot shape of the second light, wherein the controller is configured to obtain the information from the memory and generate the first filter and the second filter based on the information.

30. The image forming apparatus according to claim 27, wherein the first filter and the second filter are two-dimensional filters, and each of the two-dimensional filters includes a filter coefficient corresponding to the target pixel and a plurality of filter coefficients of which each corresponds to one of the adjacent pixels.

31. The image forming apparatus according to claim 27, wherein each of the first filter and the second filter includes a plurality of filter coefficients, each of the plurality of filter coefficients corresponding to one of the adjacent pixels, and wherein controller applies each of the plurality of filter coefficients to the pixel data for the adjacent pixels.

32. The image forming apparatus according to claim 27, wherein the first light emitting element and the second light emitting element are light emitting diodes.

33. The image forming apparatus according to claim 27, wherein the exposure head includes a substrate on which the light emitting array is arranged and configured to receive the first and second driving data, and wherein the controller is configured to output the first and second driving data to the substrate.

* * * * *